No. 700,385. Patented May 20, 1902.
M. M. SWEETMAN.
CHURN.
(Application filed July 12, 1901.)
(No Model.)
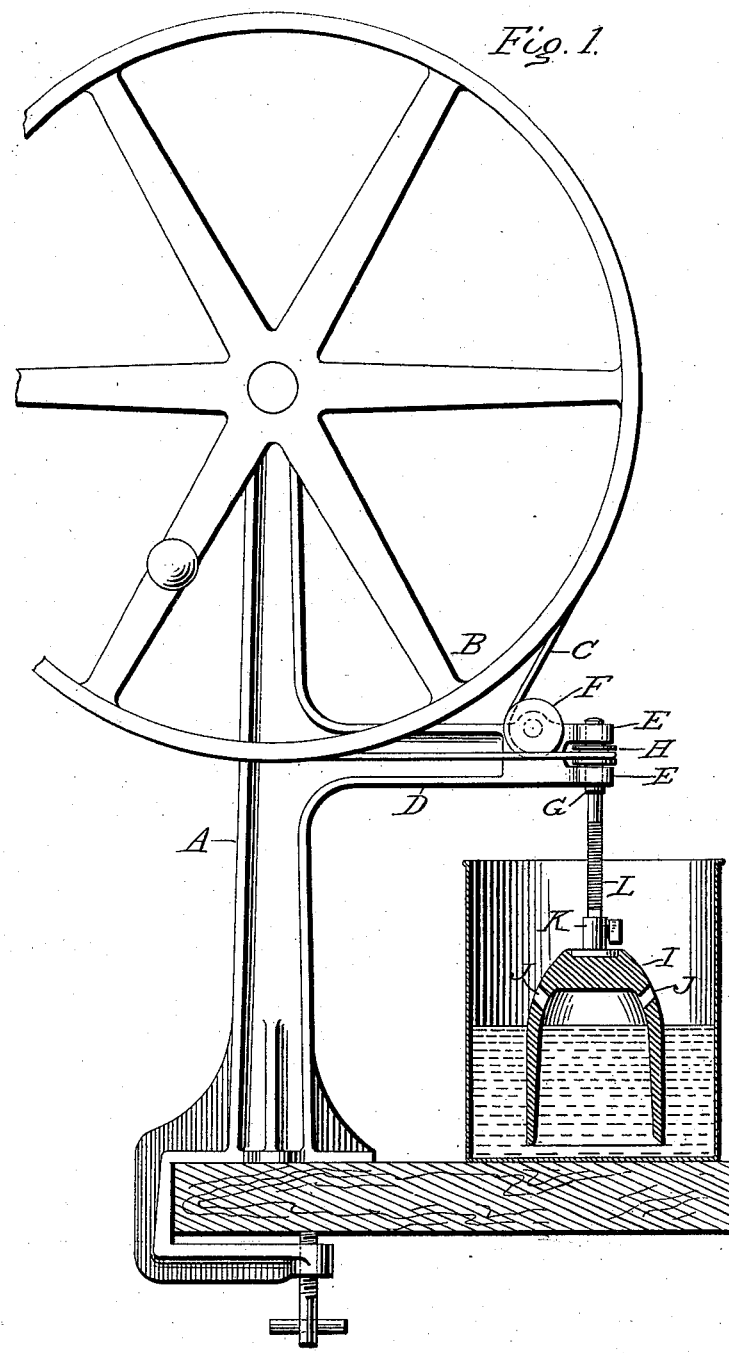
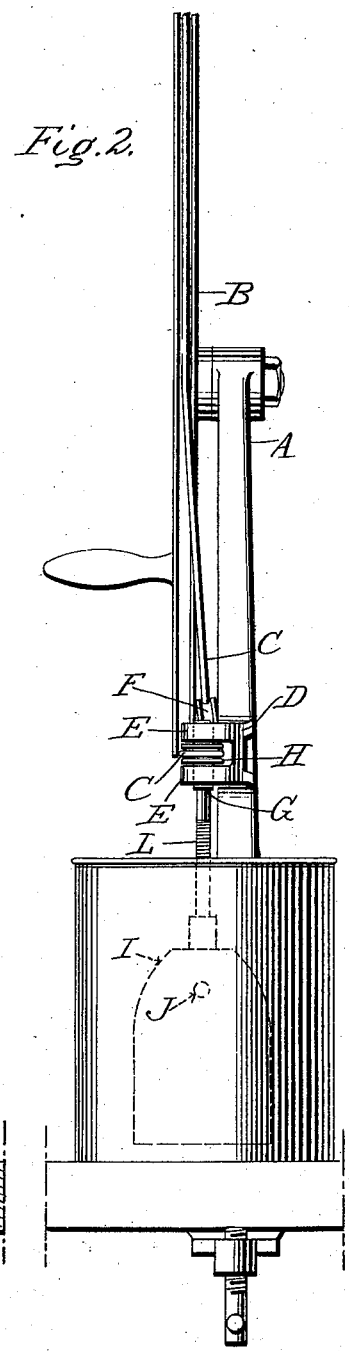
Fig. 1.
Fig. 2.
Attest:
Inventor:
Michael M. Sweetman,
by Dodge and Sons,
Attys.

UNITED STATES PATENT OFFICE.

MICHAEL M. SWEETMAN, OF KANSAS CITY, MISSOURI.

CHURN.

SPECIFICATION forming part of Letters Patent No. 700,385, dated May 20, 1902.

Application filed July 12, 1901. Serial No. 68,054. (No model.)

*To all whom it may concern:*

Be it known that I, MICHAEL M. SWEETMAN, a citizen of the United States, residing at Kansas City, in the county of Jackson and State of Missouri, have invented certain new and useful Improvements in Churns, of which the following is a specification.

My present invention pertains to churns, the construction and advantages of which will be hereinafter set forth, reference being had to the annexed drawings, wherein—

Figure 1 is a side elevation of the churn, the receptacle and the agitator, beater, or whip being shown in section; and Fig. 2, an end view.

The object of the invention is to produce a simple and effective churn with which a small quantity of butter may be readily and quickly made. The churn in the embodiment illustrated is a portable one, though certain of its features may be employed in larger churns, if so desired.

Referring to the drawings, A designates a suitable upright or standard, through the upper end of which extends an axle or stud carrying a relatively large driving-wheel B, the rim of which is grooved to receive an endless band or belt C. The lower end of the standard is provided with the usual clamp for securing the device to the edge of a table or the like. An arm D extends out laterally from the standard A, the end of the arm being bifurcated, as shown, forming two members E E. A pulley F is disposed on a horizontal pivot at a point on the arm D adjacent to its end members, the bottom of said pulley being in alinement with the opening intermediate said horizontal members or arms E. A spindle G is journaled in the members E, and a pulley H is rigidly affixed thereto intermediate said members.

The whip or beater I is made in the shape of an inverted cup or is bell-shaped, being open at the bottom and wholly closed at the top but for a series of openings J, formed therein near the upper end. The openings by preference are inclined downwardly, as shown. A collar K is secured to the top of the whip, and a piece of flexible shafting L forms the connection intermediate said collar and the spindle G.

Belt C, as shown, passes about the large driving-wheel B and the pulleys F and H, the difference in proportion between the driving and the driven members being such that twenty-five hundred revolutions of the spindle B and the whip may be easily obtained.

Cream being placed in the receptacle to a point just below the openings J, motion is imparted to the whip, and air is drawn down through the openings J and forced through the cream within the whip and up through the mass outside of the same. The rapid rotation of the whip tends to force the cream out of the lower portion thereof, and as a consequence draws the air in through the openings J. The flexible shaft also causes the whip to move around in the vessel in a somewhat erratic path or course, and thereby stirs up or agitates the entire mass of material. This erratic movement in conjunction with the air which is drawn in and forced through the material effectually and rapidly separates the fat particles, producing butter in a very short space of time.

Having thus described my invention, what I claim is—

1. In a churn, the combination of a bell-shaped whip open at its lower end, and provided with a relatively small opening in its upper face above the line of immersion; and a flexible shaft connected to the upper end of the whip and forming its sole means of support; and means for rotating said shaft.

2. In a churn, the combination of a bell-shaped whip, open at its lower end and having a series of downwardly-inclined openings formed in its upper end; a flexible shaft connected to the upper end of the whip and forming its sole means of support; and means connected to said shaft for imparting rotary motion thereto.

3. In a churn, the combination of a bell-shaped whip, open at its lower end, and having a series of downwardly-inclined openings in its upper end; a flexible shaft connected to the upper end of the whip and forming its sole means of support; a spindle connected to said shaft, said spindle being mounted in fixed bearings; a pulley carried by said spindle; and means for imparting motion thereto.

4. In a churn, the combination of a receptacle; a whip having imperforate side walls mounted therein; means for imparting rotary motion to said whip and causing it to move about in the receptacle in an irregular path; and means for permitting air to pass into the interior of the whip and out through the bottom of the same.

In testimony whereof I have signed my name to this specification in the presence of two subscribing witnesses.

MICHAEL M. SWEETMAN.

Witnesses:
W. D. SNYDER,
JNO. S. PULLEN.